United States Patent

[11] 3,567,175

| [72] | Inventor | Joseph S. Sciuto, Jr., Crestwood, Mo. |
|---|---|---|
| [21] | Appl. No. | 765,854 |
| [22] | Filed | Oct. 8, 1968 |
| [45] | Patented | Mar. 2, 1971 |
| [73] | Assignee | Stile-Craft Manufacturers, Inc. St. Louis, Mo. |

[54] QUICK RELEASE COUPLING
11 Claims, 5 Drawing Figs.

[52] U.S. Cl.................................................. 251/149.6, 285/12
[51] Int. Cl.................................................. F16l 37/28
[50] Field of Search.......................................... 251/149.5, 149.6; 137/269; 285/12

[56] References Cited
UNITED STATES PATENTS

| 1,937,982 | 12/1933 | Rudolph........................ | 285/12X |
| 1,968,075 | 7/1934 | Ewald........................... | 251/149.5 |
| 2,092,116 | 9/1937 | Hansen......................... | 251/149.6X |
| 2,092,243 | 9/1937 | Breese.......................... | 285/12 |
| 2,327,611 | 8/1943 | Scheiwel....................... | 251/149.6X |
| 2,377,812 | 6/1945 | Scheiwel....................... | 251/149.6X |
| 2,744,770 | 5/1956 | Davidson et al............... | 251/149.6X |
| 3,131,905 | 5/1964 | Nyberg.......................... | 251/149.6 |

*Primary Examiner*—William R. Cline
*Attorney*—Cohn and Powell

ABSTRACT: This fluid system coupling includes a stepped female adapter fitting, socket portions of successively increasing diameter adapted to accommodate interchangeable male plugs of different size. The plugs, which include stepped nose and tail sections, are sealed by the same O-ring. A detent ball-locking means is provided which locks either of the plugs into coupled relation with the adapter fitting. The adapter fitting includes a resiliently mounted valve means actuated by the plug. The mounting of the plugs is such as to preclude tilting within the adapter fitting. Stop means within the adapter fitting limit the insertion of each plug beyond a predetermined point.

PATENTED MAR 2 1971 3,567,175

INVENTOR
JOSEPH S. SCIUTO, JR.
BY
Cohn and Powell
ATTORNEYS

QUICK RELEASE COUPLING

BACKGROUND OF THE INVENTION

This invention relates in general to fluid system couplings of the quick-connect-disconnect type, and in particular to a socketed coupling in a pneumatic line which is adapted to receive different plugs of various sizes.

A factory or industrial firm that has used couplings having particular sockets and plugs has been forced to replace a worn or damaged socket with an identical socket in order to use the same plug. Further, the particular socket could not be used to accommodate a plug of different size. For this reason, the source of supply was restricted and caused higher costs in purchasing, and restricted the user to use of only the one type of plug and socket.

In general, couplings are carefully matched, each socket fitting being specifically made to fit one plug fitting. Unfortunately, in some instances, discrepancies in the sizes of the plugs supplied by various manufactures are small and not readily obvious to the eye. Thus, on occasions, a plug may be inadvertently fitted to a socket too large to receive it with adequate sealing with resultant loss of as through leakage.

Perhaps even more serious is the situation in which a plug, known to be too small, is, nevertheless, fitted into a socket too large for proper sealing engagement. The problem is that such a coupling may operate effectively as long as the male and female parts are aligned, and may develop a leak only when later misalignment takes place, such misalignment being due to jarring or other disturbance of the line. This situation is particularly dangerous because such a leak can remain undetected for a long period of time.

SUMMARY OF THE INVENTION

The present device includes an adapter fitting which is capable of receiving plugs of different sizes in effectively sealed relation.

A factory or industrial firm may now replace a worn or damaged socket with one of different construction from another source, and such replacement socket will permit the use of the old plug or another type plug having different dimensions. The user has greater flexibility in the usage of the sockets and plugs, and because the user is not restricted as to the source of supply for either new or replacement parts, greater economy is realized.

The device permits effective coupling to be made, notwithstanding the use of different-sized plugs in one adapter fitting, because the male and female parts are held in axial alignment and locked in such a manner to ensure that alignment is maintained.

The coupling includes a stepped female adapter fitting having a first, forward socket portion and a second rearward socket portion having a diameter greater than the first socket portion. The adapter fitting receives first and second interchangeable male plugs, each of the plugs including a nose section receivable within the first socket portion, and a tail section receivable within the second socket portion but not the first socket portion. Corresponding sections on each plug are of different maximum diameter.

Sealing means are disposed in the first socket portion of the adapter which sealingly engage either plug selectively, and locking means disposed between the adapter fitting and the selected plug hold the two selected parts in coupled relation.

The sealing means includes a first sealing ring having an internal diameter less than the diameter of either of said nose sections. One of the nose sections is operatively received through the sealing ring in sealing engagement and the other of the nose sections operatively abuts the sealing ring peripherally in sealing engagement.

The adapter includes first and second stop means, and each plug includes shoulder means engaging one or the other of the stop means to determine the limit of insertion of the plug relative to the sealing ring.

The adapter fitting includes a socket portion of intermediate diameter disposed between the first and second socket portions. The tail section of the first plug is received in peripheral bearing relation in the intermediate section, and the tail secton of the second plug includes a rearward portion receivable in the second socket portion only in peripheral bearing relation.

The locking means includes alignable depressed portions disposed in each of the coupled fittings, and a detent member is operatively disposed in shearing relation transversely between said portions. A reciprocating sleeve is coaxially mounted on the adapter and is engageable with the detent member to depress said member into the lock position.

The adapter fitting includes a valve means, resiliently mounted in a valve chamber forward of the first socket which incorporates alignment means engageable with either plug for forward, axially aligned movement into the valve-open position. The alignment means includes trip members engageable with either plug.

DESCRIPTION OF THE PREFERRED EMBODIMENT

Figure 1:
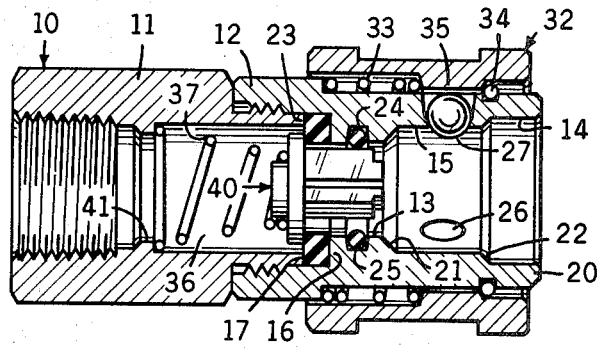
FIG. 1 is a sectional elevation of the uncoupled adapter fitting illustrating the valve means in the closed position.

Referring now by characters of reference to the drawing and first to FIG. 1, it will be understood that the female adapter fitting 10 includes body portions 11 and 12 connected together in threaded relation. The interior of the body portion 12 is stepped to provide first, second and intermediate communicating socket portions 13, 14 and 15 respectively.

The socket portions, 13, 14 and 15 are longitudinally defined by an annular seating face 16 which accommodates an annular washer 17 and the rearward rim 20. Angularly related stepped portions 21 and 22 separate the first and second socket portions 13 and 14 from the adjacently disposed intermediate socket portion 15. The seating face 16 and rear rim 23 of the front body portion 11 provide a housing for the annular washer 17.

It will be clear from FIG. 1 that the first, intermediate and second socket portions 13, 15 and 14 are of successively increased diameter.

The first socket portion 13 includes an annular groove 24 receiving an O-ring 25 that projects inwardly into the first socket portion 13. The intermediate socket portion 15 includes a plurality of tapered holes 26, each hole 26 accommodating a detent locking ball 27. The holes 26 are tapered inwardly to a diameter less than that of the medium diameter of the balls 27 whereby to retain the balls 27, yet allow them to project inwardly of the socket 15. The balls 27 and the holes 26 constitute part of a locking means enabling either of the plugs 30 or 31, illustrated in FIGS. 2 and 3 respectively, to be locked in coupled relation within the adapter fitting 10.

The locking means also includes an reciprocating sleeve 32 coaxially mounted on the adapter fitting 10. A spring 33 is mounted on the adapter fitting 10 and constitutes resilient means between the adapter fitting 10 and the sleeve 32 tending to urge the sleeve 32 rearwardly into engagement with a retaining ring 34, whereby a bearing ring 35, integrally formed on the inner surface of the sleeve 32, is maintained in position outwardly adjacent of the detent locking balls 27. The sleeve 32 may be pushed forward digitally against the action of the spring 33 and the balls 27 are thereby released.

A valve chamber 36 is disposed forwardly of and communicates with first socket portion 13. A valve means is resiliently mounted in the adapter fitting 10 by means of a spring 37, for movement between the first socket portion 13 and the valve chamber 36.

Figure 4:
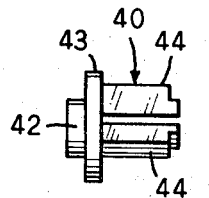
FIGS. 4 and 5 are side end elevational views respectively of the valve member.
Figure 5:
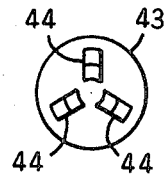

The spring 37 is engaged at one end by an annular abutment 41 formed within the adapter fitting 10. The spring 36 has a tapered configuration to provide a seating ring at its other end, which accommodates a spigot 42 (FIG. 4) projecting from the forward end of the valve means 40. The spring 37 tends to urge the valve means 40 in a rearward direction so a circumferential valve flange 43 is seated against the washer 17 in the valve-closed position. The valve means 40 includes a tripod arrangement of legs 44 which are notched at their ends remote from the flange 43 so as to engage the forward end of each of the interchangeable plugs 30 and 31. The notches are engagingly compatible with the annular ring at the forward end of each said hollow plugs 30 and 31.

Figure 2:
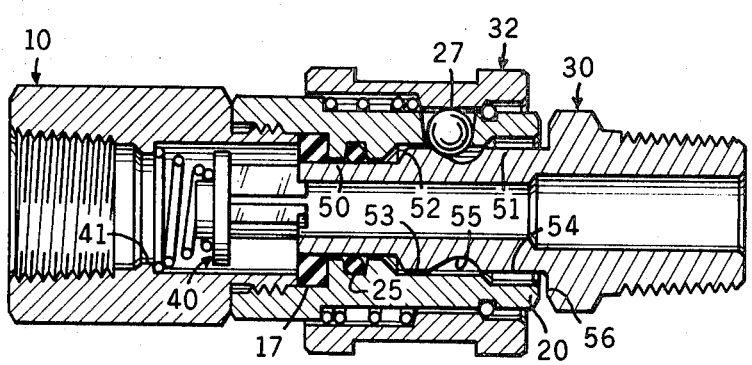
FIG. 2 is a sectional elevation of the coupling, illustrating the juxtaposition of parts in the valve-open position for a particular type of plug.
Figure 3:
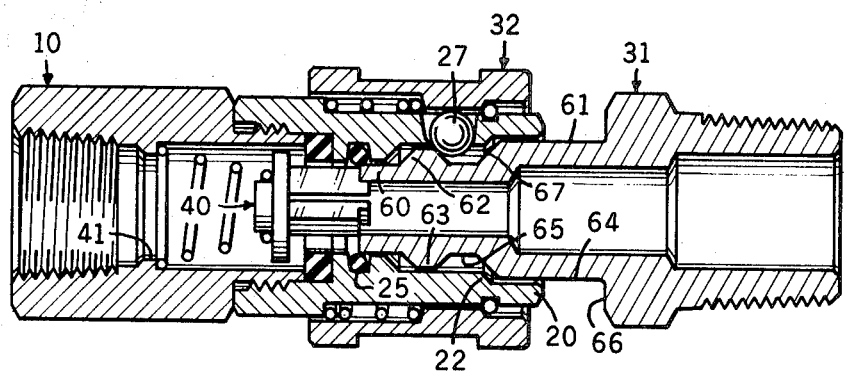
FIG. 3 is a cross section similar to FIG. 2, but showing a different plug.

The plugs 30 and 31, illustrated in FIGS. 2 and 3 respectively, have somewhat the same basic shape but are different from each other in dimensional detail. More specifically, plug 30 is, generally speaking, diametrically smaller than plug 31 to the extent that a conventional female socket designed for plug 30 would be too small to receive plug 31. On the other hand, a conventional socket for plug 31 would not provide satisfactory sealing engagement for plug 30.

Plug 30, (FIG. 2) constituting a first male plug, includes a nose section 50 and a tail section 51, the sections being separated by angularly related step 52. The tail section 51 has a greater maximum diameter than the nose section 50, and includes a forward portion 53 and a rearward portion 54. The forward portion 53 includes an annular groove 55 constituting a depression. The groove 55 receives the detent balls 27 and forms part of the locking means.

The nose section 50 is slightly greater in diameter than the working internal diameter of both the O-ring 25, and the internal diameter of the annular washer 17, and is operatively received within the O-ring 25 and the washer 17 in sealing engagement.

The forward and rearward portions 53 and 54 of the tail portion 51, except of course for the groove 55, are of substantially the same diameter and are received within the intermediate socket portion 15 in peripheral bearing relation.

In the preferred embodiment, the rearward rim 20, of the adapter body portion 12, constitutes a first stop means limiting insertion of plug 30 relative to the O-ring 25. The annular abutment 56 of the plug 30 constitutes a shoulder engaging the rearward rim 20.

Turning now to FIG. 3, the interchangeable plug 31 constituting a second male plug, includes substantially all of the features referred to with respect to the plug 30 except that the sizes of the various parts and their structural arrangement are different. For example, plug 31 includes a nose section 60 which is shorter than the nose section 50 of plug 30 and of greater diameter. The plug 31 includes a tail section 61 separated from the nose section 60 by an angularly related step 62. The tail section 61 includes a forward portion 63 and a rearward portion 64, the forward portion 63 includes an annular groove 65. The rearward portion 64 is slidably received in peripheral bearing relation within the second socket portion 14 of the adapter fitting 10.

The maximum diameter of the tail section 61 is greater than the diameter of the nose section 60, and is also greater than the rearward portion 54 of the tail section 51 of the first plug 30 so that unlike the rearward portion 54 of the first plug 30, the rearward portion 64 of the second plug 31 is of too great a diameter to be received in the intermediate socket portion 15. However, that portion of the forward portion 63 which is forward of the groove 65 is received in the intermediate socket portion 15.

As disclosed in FIG. 3, the second plug 31 includes an annular shoulder 67 which engages the annular, stepped abutment 22 of the adapter fitting 10. The annular abutment 22 constitutes a second stop means disposed within the adapter fitting 10 in spaced longitudinal relation from the first stop means represented by the annular rim 20. The engagement by the shoulder 67 of the abutment 22 determines the limit of insertion of the second plug 31 relative to the O-ring 25. When the second plug 31 is initially inserted, the tip of the nose section is initially extended into the O-ring 25. The internal diameter of the O-ring 25 is less than the diameter of the nose section 60, and hence the O-ring 25 is squeezed outwardly when plug 31 is fully inserted. However, the play in the locking mechanism, provided by the ball detent 27 and groove 65 respectively, causes the second plug 31 to be urged slightly rearwardly under the action of the tapered spring 37 via the agency of the valve means 40. Thus, the operative sealing engagement between the O-ring 25 and the tip of the nose section 60 occurs somewhat to the rear of the plane of minimum internal diameter of the O-ring 25. The tip of the nose section 60 is hence sealingly engaged by peripherally abutting the O-ring 25 rather than by being operatively received through said O-ring 25 as is the case with the nose section 50 of first plug 30. By utilizing the O-ring 25 for both plugs 30 and 31 in this manner, the O-ring 25 does not become overstretched and permanently deformed.

It is thought that the structural features of this coupling have become fully apparent from the foregoing description of parts, but for completeness of disclosure the operation of the coupling will be briefly described.

When the coupling is not in use, the valve means 40 is, of course, in a closed position and the flange 23 of said valve means 40 is urged into sealed relation against the forward face of the washer 17 by the spring 37.

Upon insertion of either the first plug 30 or the second plug 31, the nose section of the selected plug engages the notched tripod legs 44 of valve means 40, and the valve means 40 is urged against the spring 37 into a valve-open position. The notched formation at the end of the tripod lets 44 provides three points of support between the valve means 40 and the nose section of the selected plug, and hence assures stability of the valve means 40 during its longitudinal movement. The valve means 40 is thus maintained in axial alignment with the adapter fitting 10, and tilting of the valve means 40 is thereby precluded.

With regard to the coupling of the first plug 30 in particular, it will be understood from FIG. 2 that, as the plug 30 is inserted, the stepped formation of the socket, particularly in view of the angularity of the steps 21 and 22, tends to guide the nose section 50 of plug 30 into received sealing engagement with the O-ring 25. Further facilitating the insertion of the plug 30, and acting to guide it, is the existence of substantially peripheral bearing between the tail section 51 and the intermediate socket portion 15.

It will be understood that, immediately before insertion, the reciprocating sleeve 32 is pushed forward digitally. This action permits the detent balls 27 to ride up the inclined plane presented by the annular shoulder 52. When the limit of insertion has been reached, as demonstrated by engagement between the rearward rim 20 and the annular shoulder 56, the detent balls 27 fall into place in the annular groove 55. When the balls 27 are in place, the sleeve 43 is released and the bearing ring 35, interiorally of the sleeve 32, is urged rearwardly by the spring 33 to cover the holes 26 housing the detent balls 27 and prevent outward movement of the balls 27.

It will be understood that the spring 37 in the valve chamber 36 tends to urge the plug 30 rearwardly. The wedge shape of the annular groove 55 tends to push the balls 27 outwardly, thus reducing slightly the extent of insertion of the plug 30. Of course, this slight "backing off" in no way affects the sealing action of the O-ring 25 because the nose section 50 projects well forward of O-ring 25, and, in fact, additional sealing is provided by the washer 17.

With regard to the washer 17, which is housed between the forward and rearward body portions 11 and 12 of the adapter fitting 10, it will be noted that the washer 17 may be squeezed slightly by threadedly drawing together body portions 11 and 12. The internal diameter of washer 17 is decreased by such squeezing and this decrease of the internal diameter affords increased sealing engagement between washer 17 and the nose section 50.

The release of the coupled plug 30 and adapter fitting 10 is effected automatically as the sleeve 32 is urged forward and the plug 30 is pushed rearwardly under the action of the spring 37. The detent balls 27 are pushed outwardly enabling the plug 30 to be withdrawn.

With regard to the coupling of second plug 31, (FIG. 3) the action occurs substantially as described above for the first plug 30, except that the guiding action is facilitated by the peripheral bearing of the rearward portion 64 of the tail section 61, as it is received within the second socket portion 14. The insertion of plug 31 is limited by abutment 22 which acts as a stop means when engaged by the shoulder 67. At the point of engagement of the stop means, the tip of the nose section 60 projects slightly into the O-ring 25 but on relaxation of the digital force urging the plug 31 forwardly, the action of the spring 37 in the valve chamber 36 urges the plug 31 rearwardly slightly. The detent balls 27 are pushed outwardly by the wedge action from the groove 65 and the tip of the nose section 60 is retracted from the O-ring 25 slightly. Sealing engagement is effectuated by peripheral abutting of the rounded tip of the nose section 60 against the O-ring 25. Of course as a practical matter, the O-ring 25 is probably still under slight distortion longitudinally the plug action. However, the radial stretching of the O-ring 25 is minimized within tolerable limits. This minimizing of the O-ring stretch permits the use of a standard O-ring, specifically designed to suit the first plug 30, to be used also for perfect sealing engagement of the second plug 31. This sealing is possible even though the diameter of the nose section 60 of said second plug 31 is greater than that of the first plug 30.

It will be understood that excessive stretching of an O-ring, standard for one plug, yet used for a larger plug, will result in time in lessening the sealing efficiency of that O-ring when used with the smaller plug. The arrangement described avoids this disadvantage.

It will be noted that the considerable peripheral bearing engagement between each of the plugs 30 and 31 and the adapter fitting 10 ensures that each plug will be held in substantial axial alignment with the adapter fitting 10. The possiblity of either plug tilting within the adapter fitting is thus precluded. Such tilting, as has already been described, tends to destroy effective sealing engagement between the plug and adapter fitting. The axial alignment is particularly effective when the tail section and the nose section of each plug are peripherally supported, longitudinally spaced support points are particularly effective in preventing tilt because of the couple effect thereby provided.

The support of the tail section of each plug has been described above. The support of the nose section 50 of plug 30 is effectuated by the sealing rings 17, 25 and also by the fit of the nose section 50 within the forward portion of the first socket portion 13. The support of nose section 60 of the plug 31 is effectuated by the O-ring 25 and also by the fit of the nose section 60 within the rearward portion of the first socket portion 13. In this context, it is an advantage to provide the wall of the socket portion 13 which is forward of the O-ring 25 with a smaller diameter than the wall rearward of the O-ring 25, thereby to accept nose section 50 but not nose section 60. Thus, the nose section 50 is supported by the forward wall of socket portion 13, and the nose section 60 by the rearward wall of socket portion 13.

Although the stop means, limiting insertion of each plug respectively, has been achieved in a specific manner as described above, it will be understood that the stop means can be achieved in another way. For example, in the case of the first plug 30, a slight variation in the location of the annular stepped abutment 21 between the first and intermediate socket portions 13 and 15 would permit that abutment to provide a stop means engaging the annular shoulder 52. (FIG. 2)

With regard to the second plug 31, a stop means limiting insertion could be provided by the decreased diameter of the first socket portion 13 forward of the O-ring 25 such that it accepts the nose section 50 of the first plug 30 but not the slightly greater diameter nose section of the second plug 31.

I claim:
1. In a fluid system coupling:
  a. a stepped female adapter fitting including:
    1. a first socket portion; and
    2. a second socket portion disposed in fixed relation to the first socket portion and having a diameter greater than the first socket portion;
  b. first and second interchangeable plugs, each of said plugs including:
    1. a nose section receivable within the first socket portion;
    2. a tail section receivable within the second socket portion but not the first socket portion; and
    3. at least one of said sections on one plug having a different diameter from the corresponding section on the other plug;
  c. sealing means disposed in the adapter fitting, the sealing means being disposed in fixed relation to both the first and second socket portions and sealingly engaging either plug selectively; and
  d. locking means selectively disposed between the adapter fitting and the selected plug to hold the adapter fitting and plug in coupled relation.

2. A fluid system coupling as defined in claim 1, in which:
  e. the nose section of the first plug has a different diameter from that of the second plug; and
  f. the fixed sealing means includes a first sealing ring having an internal diameter less than either of said nose sections.

3. A fluid system coupling as defined in claim 2, in which:
  e. the nose section of the first plug has a different diameter from that of the second plug;
  f. the fixed sealing means includes a first sealing ring having an internal diameter less than either of said nose sections;
  g. the nose section of one of said plugs is operatively received through said fixed sealing ring in sealing engagement; and
  h. the nose section of the other of said plugs operatively abuts said fixed sealing ring peripherally in sealing engagement.

4. In a fluid system coupling:
  a. a stepped female adapter fitting including:
    1. a first socket portion; and
    2. a second socket portion having a diameter greater than the first socket portion;
  b. first and second interchangeable plugs, each of said plugs including:
    1. a nose section receivable within the first socket portion;
    2. a tail section receivable within the second socket portion but not the first socket portion; and
    3. at least one of said sections on one plug having a different diameter from the corresponding section on the other plug;
  c. sealing means disposed in the adapter fitting, the sealing means sealingly engaging either plug selectively;
  d. locking means selectively disposed between the adapter fitting and the selected plug to hold the adapter fitting and plug in coupled relation;
  e. the nose section of the first plug having a different diameter from that of the second plug;
  f. the sealing means including a first sealing ring having an internal diameter less than either of said nose sections;
  g. the nose section of one of said plugs being operatively received through the sealing ring in sealing engagement;
  h. the nose section of the other of said plugs operatively abutting the sealing ring peripherally in sealing engagement;
  i. the adapter fitting including first and second stop means disposed in spaced longitudinal relation;

j. the first plug including shoulder means engaging the first stop means to determine the limit of insertion of said plug relative to the sealing ring; and k. the second plug including shoulder means engaging the second stop means to determine the limit of insertion of said plug relative to the sealing ring.

5. In a fluid system coupling:
a. a stepped female adapter fitting including:
  1. a first socket portion; and
  2. a second socket portion having a diameter greater than the first socket portion;
b. first and second interchangeable plugs, each of said plugs including:
  1. a nose section receivable within the first socket portion;
  2. a tail section receivable within the second socket portion but not the first socket portion; and
  3. at least one of said sections on one plug having a different diameter from the corresponding section on the other plug;
c. sealing means disposed in the adapter fitting, the sealing means sealingly engaging either plug selectively;
d. locking means selectively disposed between the adapter fitting and the selected plug to hold the adapter fitting and plug in coupled relation;
e. the nose section of the first plug having a smaller diameter than that of the second plug;
f. the sealing means including first and second sealing rings disposed in spaced longitudinal relation in the first socket portion;
g. the nose section of the first plug being operatively received in sealing engagement through both sealing rings;
h. the nose section of the second plug being operatively received in peripherally abutting, sealing engagement against the first sealing ring;
i. the adapter fitting including first and second stop means disposed in spaced longitudinal relation; and
j. the first and second plugs each including shoulder means engaging the first and second stop means respectively to limit insertion of said fittings relative to the first sealing ring.

6. In a fluid system coupling:
a. a stepped female adapter fitting including:
  1. a first socket portion; and
  2. a second socket portion having a diameter greater than the first socket portion;
b. first and second interchangeable plugs, each of said plugs including:
  1. a nose section receivable within the first socket portion;
  2. a tail section receivable within the second socket portion but not the first socket portion; and
  3. at least one of said sections on one plug having a different diameter from the corresponding section on the other plug;
c. sealing means disposed in the adapter fitting, the sealing means sealingly engaging either plug selectively;
d. locking means selectively disposed between the adapter fitting and the selected plug to hold the adapter fitting and plug in coupled relation;
e. the tail section of the first plug having a maximum diameter less than the maximum diameter of the second plug; and
f. the second socket portion receiving the tail section of the second plug, but not the first plug, substantially in peripheral bearing relation.

7. A fluid system coupling as defined in claim 6, in which:
g. the adapter fitting includes an intermediate socket portion disposed between the first and second socket portions and having a diameter intermediate of that of the first and second socket portions; and
h. the intermediate socket portion receives the tail section of the first plug substantially in peripheral bearing relation.

8. A fluid system coupling as defined in claim 7, in which,
i. each tail section includes a forward portion and a rearward portion; and
j. the intermediate socket portion has a diameter less than the diameter of the rearward portion of the tail section of the first plug whereby to receive said rearward portion.

9. In a fluid system coupling:
a. a stepped female adapter fitting including:
  1. a first socket portion; and
  2. a second socket portion having a diameter greater than the first socket portion;
b. first and second interchangeable plugs, each of said plugs including:
  1. a nose section receivable within the first socket portion;
  2. a tail section receivable within the second socket portion but not the first socket portion; and
  3. at least one of said sections on one plug having a different diameter from the corresponding section on the other plug;
c. sealing means disposed in the adapter fitting, the sealing means sealingly engaging either plug selectively;
d. locking means selectively disposed between the adapter fitting and the selected plug to hold the adapter fitting and plug in coupled relation;
e. the adapter fitting including a valve chamber forwardly disposed of the first socket portion and communicating therewith;
f. valve means resiliently mounted in the adapter fitting for movement between the first socket portion and the valve chamber;
g. the valve means including alignment means engageable with either plug for forward, axially aligned movement into the open valve position;
h. the nose section of the first plug having a different diameter from that of the second plug;
i. the sealing means including a first sealing ring having an internal diameter less than that of either of the nose sections, said ring being operatively disposed in sealing relation to either of said nose sections;
j. the sealing means including a second sealing ring disposed in spaced, longitudinal relation to the first sealing ring;
k. the valve means including a flange urged rearwardly into sealing engagement against the second sealing ring in the closed valve position; and
l. the alignment means including tripod members engageable with either plug.

10 In a fluid system coupling:
a. a stepped female adapter fitting including:
  1. a first socket portion; and
  2. a second socket portion having a diameter greater than the first socket portion;
b. first and second interchangeable plugs, each of said plugs including:
  1. a nose section receivable within the first socket portion;
  2. a tail section receivable within the second socket portion but not the first socket portion; and
  3. at least one of said sections on one plug having a different diameter from the corresponding section on the other plug;
c. sealing means disposed in the adapter fitting, the sealing means sealingly engaging either plug selectively;
d. locking means selectively disposed between the adapter fitting and the selected plug to hold the adapter fitting and plug in coupled relation;
e. the nose section of the first plug having a diameter less than that of the nose section of the second plug;
f. the sealing means including a first sealing ring disposed in the first socket portion, said ring having an internal diameter less than that of either nose section;
g. the nose section of the first plug being operatively received through the sealing ring in sealing engagement, and the nose section of the second plug being operatively received in peripherally abutting, sealing engagement against said sealing ring;
h. the adapter fitting including first and second stop means disposed in spaced longitudinal relation;
i. the first and second plugs each including shoulder means engaging the first and second stop means respectively to limit insertion of said plug relative to said sealing ring;
j. the adapter fitting including an intermediate socket portion disposed between the first and second socket portions and having a diameter intermediate of that of the first and second socket portions;
k. the intermediate socket portion receiving the rearward portion of the tail section of the first plug in peripheral bearing relation but being too small to receive the rearward portion of the tail section of the second plug; and the second socket portion receiving the rearward portion of the tail section of the second plug substantially in peripheral bearing relation.

11. A fluid system coupling as defined in claim 10, in which:
m. the locking means includes a plurality of lateral holes circumferentially disposed substantially in the same plane in the intermediate socket portion, and a detent ball housed in each hole, the locking means including an annular groove disposed on the forward portion of the tail section of each plug, said groove being disposed din operatively alignable relation with the holes; and
n. the detent balls operatively locking either plug into coupled relation with the adapter fitting.